M. CASSIDY.
CLEVIS.
APPLICATION FILED APR. 19, 1910.
972,998.
Patented Oct. 18, 1910.
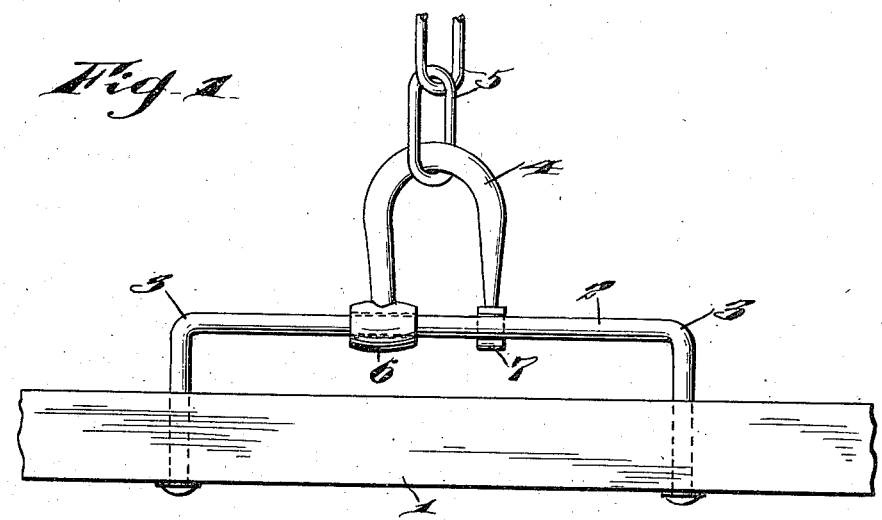
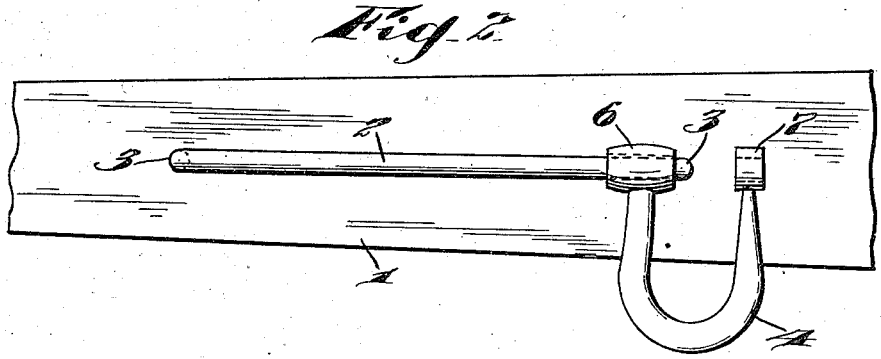
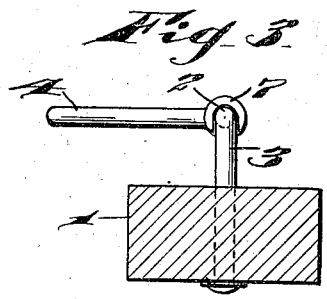
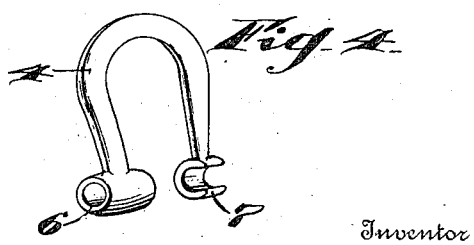
Witnesses
Inventor
Miles Cassidy,
By Joshua R. H. Potts.
Attorney

UNITED STATES PATENT OFFICE.

MILES CASSIDY, OF ARDMORE, PENNSYLVANIA.

CLEVIS.

972,998. Specification of Letters Patent. Patented Oct. 18, 1910.

Application filed April 19, 1910. Serial No. 556,416.

*To all whom it may concern:*

Be it known that I, MILES CASSIDY, a citizen of the United States, residing at Ardmore, in the county of Montgomery and State of Pennsylvania, have invented certain new and useful Improvements in Clevises, of which the following is a specification.

My invention relates to improvements in clevises, the object of the invention being to provide an improved clevis which when in normal working position is securely coupled to its rod or support, and which must be moved to an unusual position and then moved longitudinally on its rod or support before a chain or other device connected thereto can be disconnected.

A further object is to provide a clevis of this kind which is especially adapted for connecting the back chain of a dump cart harness with the thill or shaft, but which is adapted for a wide range of uses other than illustrated.

With these and other objects in view, the invention consists in certain novel features of construction and combinations and arrangements of parts as will be more fully hereinafter described and pointed out in the claims.

In the accompanying drawings: Figure 1, is a fragmentary view in side elevation illustrating my improvements in normal working position. Fig. 2, is a plan view illustrating my improved device in its uncoupled position. Fig. 3, is an end view of Fig. 2, and Fig. 4, is a perspective view of my improved clevis removed.

1, represents the thill or shaft of a dump-cart and 2 the ordinary rod secured to the thill and bent near its ends as shown at 3, so as to position the intermediate portion of the rod parallel with the thill.

4, represents my improved clevis, and 5 are links of the chain such as ordinarily employed as a back chain in harness. My improved clevis is of general U-shape as shown, and at one end is provided with an integral sleeve 6 to slide upon rod 2, on the other end of the clevis a hook 7, hook 7 and sleeve 6 being integral with the U-shaped member. The hook 7 is so disposed that when the device is in its normal vertical position, the hook 7 will engage over the top, the side, and the bottom of rod 2, and will assist sleeve 6 in sustaining the strain on the clevis. To disconnect the chain 5 it is necessary to move the clevis 4 to a horizontal position as shown in Fig. 2, and then slide the clevis along the rod, and as the open side of the hook 7 will then be lowermost, it may be slid off the bent portion 3 of rod 2 and allow the chain to be removed. When the chain is again inserted, it is simply necessary to slide the clevis back while in a horizontal position until hook 7 passes the bend 3, and the clevis may be swung to an upright position and securely couple the chain.

While I have illustrated my improved clevis in connection with a back chain and thill, I would have it understood that the invention is in no wise limited to such a use, the clevis is adapted for various other uses, and my invention is broadly to the clevis and its manner of mounting, and I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a bent rod, of a clevis having a sleeve at one end, and a hook at its other end, both rotatably and slidably mounted on said rod, whereby the hooked end may be moved off of said rod at the bend therein, substantially as described.

2. The combination with a rod bent at two points, of a clevis having a sleeve at one end, and a hook at its other end rotatably and slidably mounted on said rod between the two bends, substantially as described.

3. The combination with a support, a rod bent adjacent its ends and secured at its ends to said support, and locating the intermediate portion of said rod parallel with the support, of a clevis, an integral sleeve on one end of said clevis mounted to slide on the intermediate portion of said rod, and a hook integral with the clevis at the other end of the clevis and adapted to slide on said rod, said hook normally engaging three sides of said rod, and adapted when moved to an unusual position to be slid off of said rod, substantially as described.

4. The combination with a support, of a bent rod secured to said support, a U-shaped clevis, an integral sleeve at one end of said clevis mounted on said rod, an integral hook on the other end of said clevis mounted on said rod, said clevis adapted to be moved on the rod to move the hook off the rod at the bend therein, substantially as described.

In testimony whereof I have signed my name to this specification in the presence of two subscribing witnesses.

MILES CASSIDY.

Witnesses:
R. H. KRENKEL,
C. E. POTTS.